UNITED STATES PATENT OFFICE.

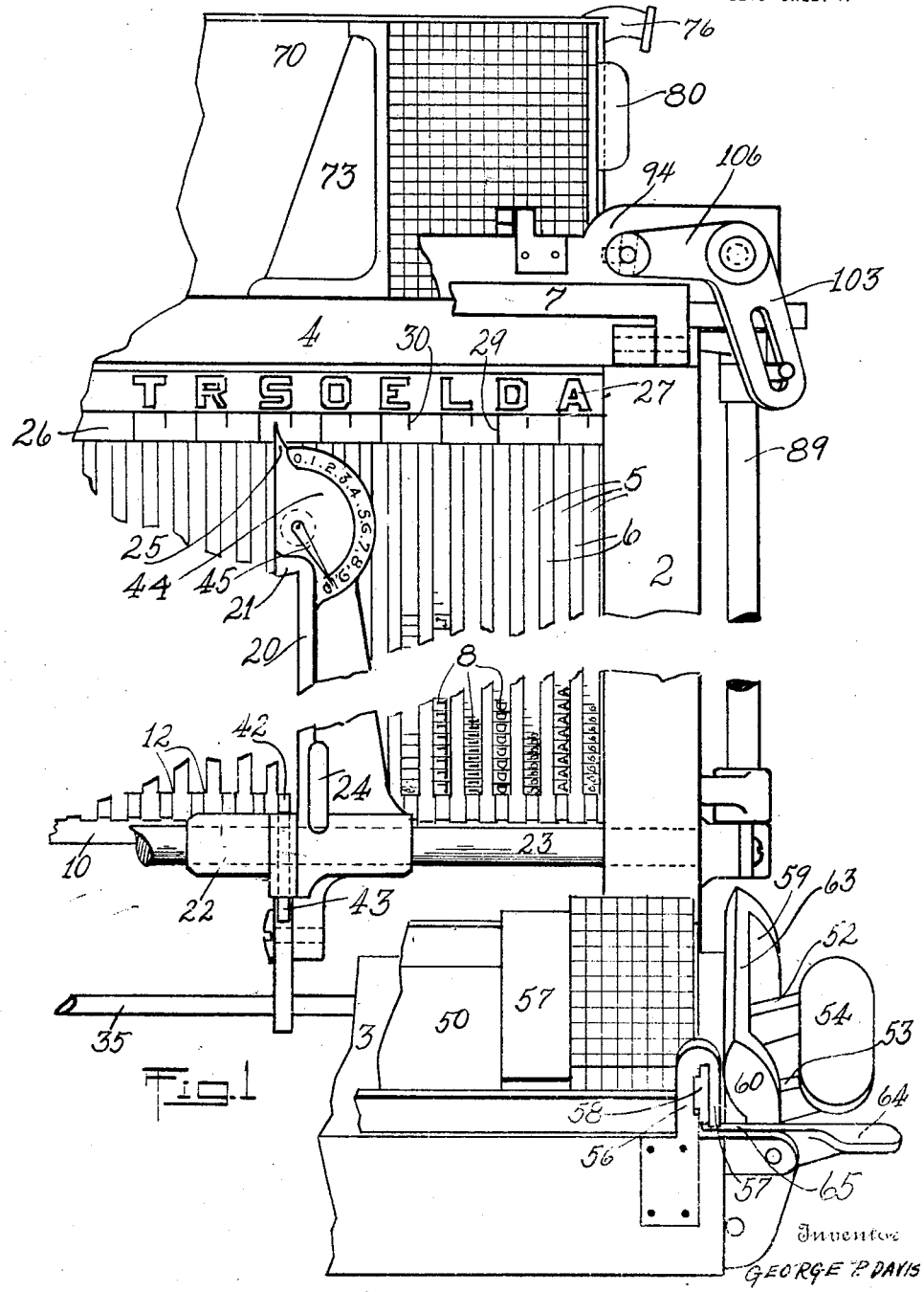

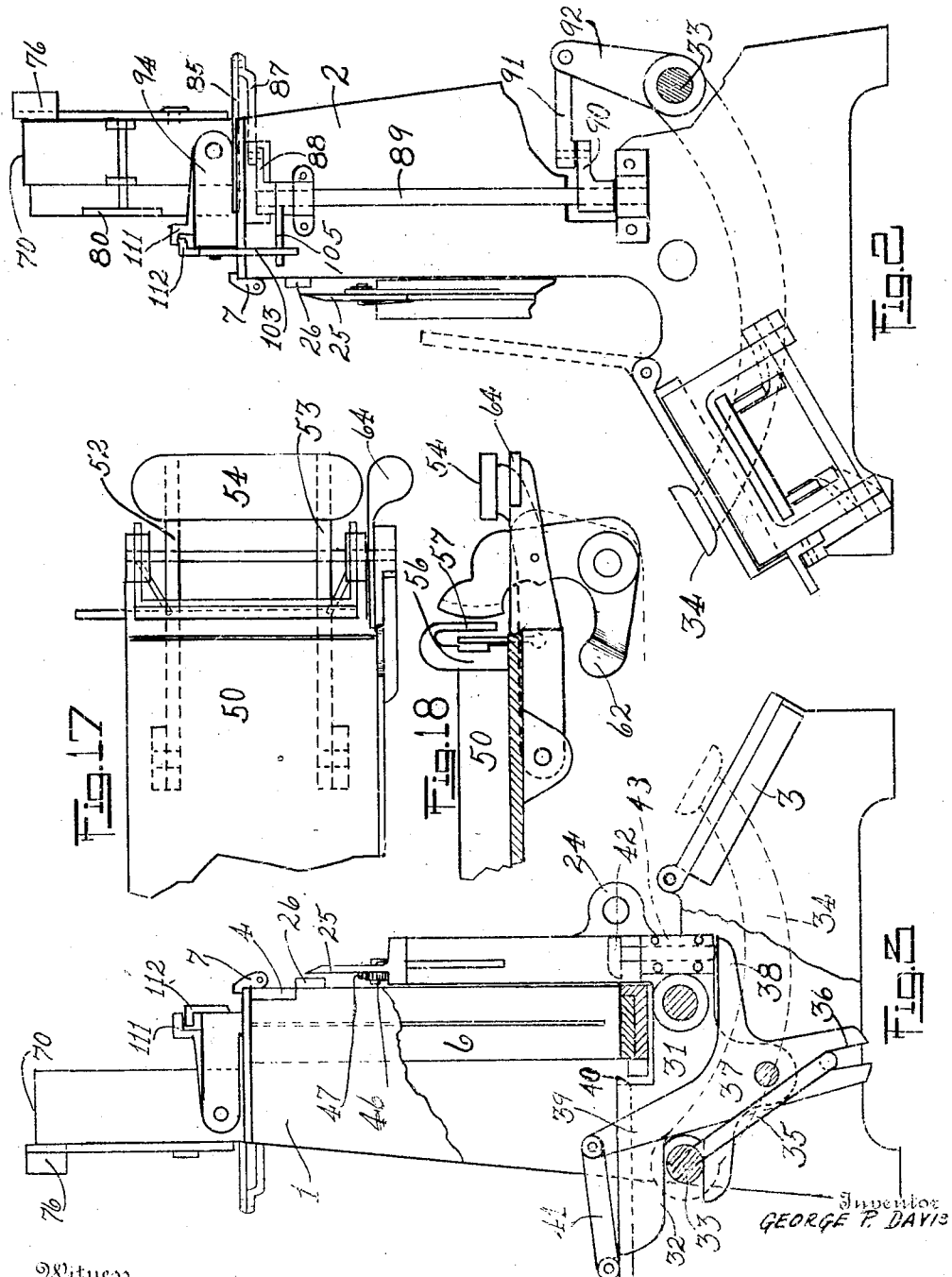

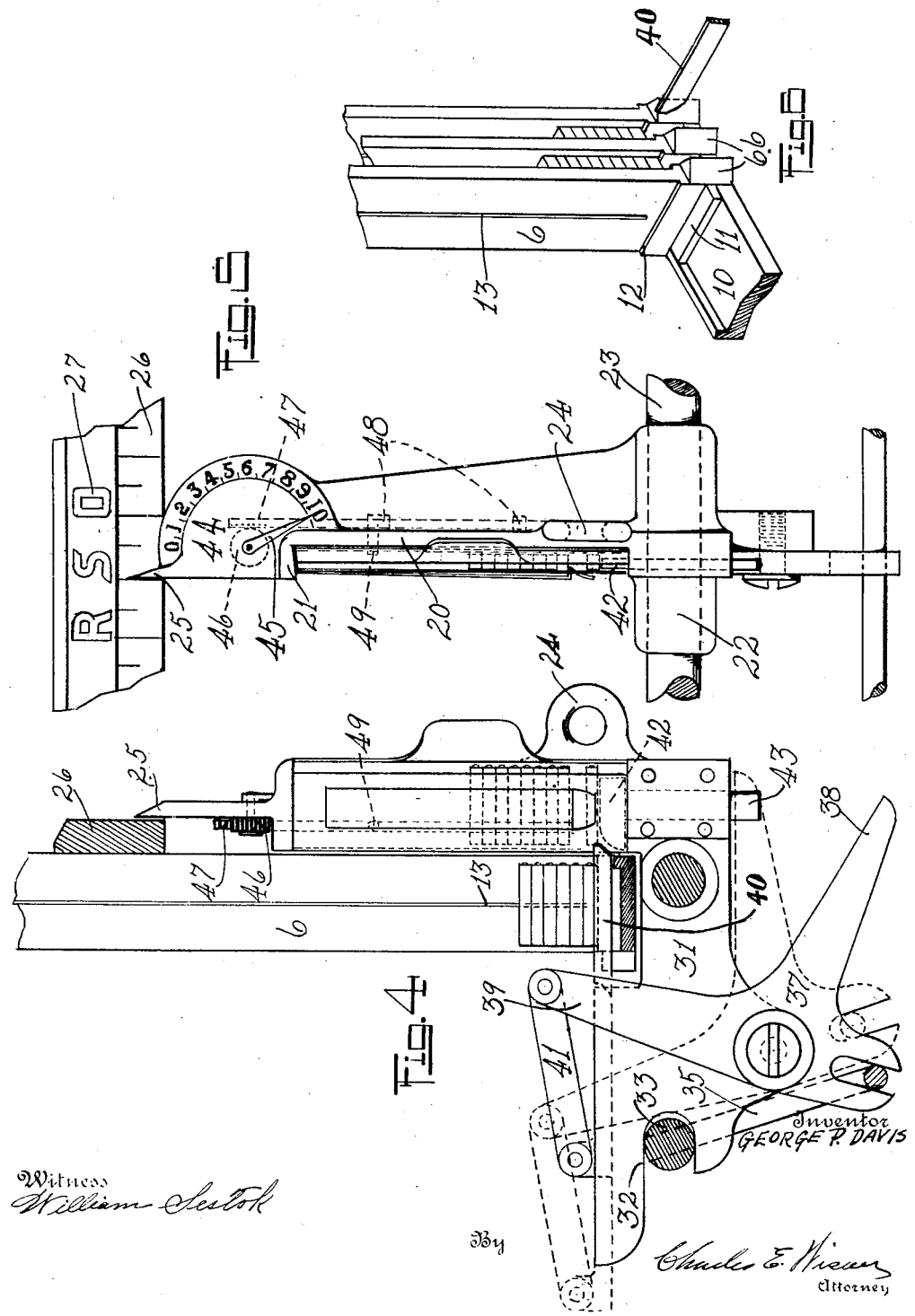

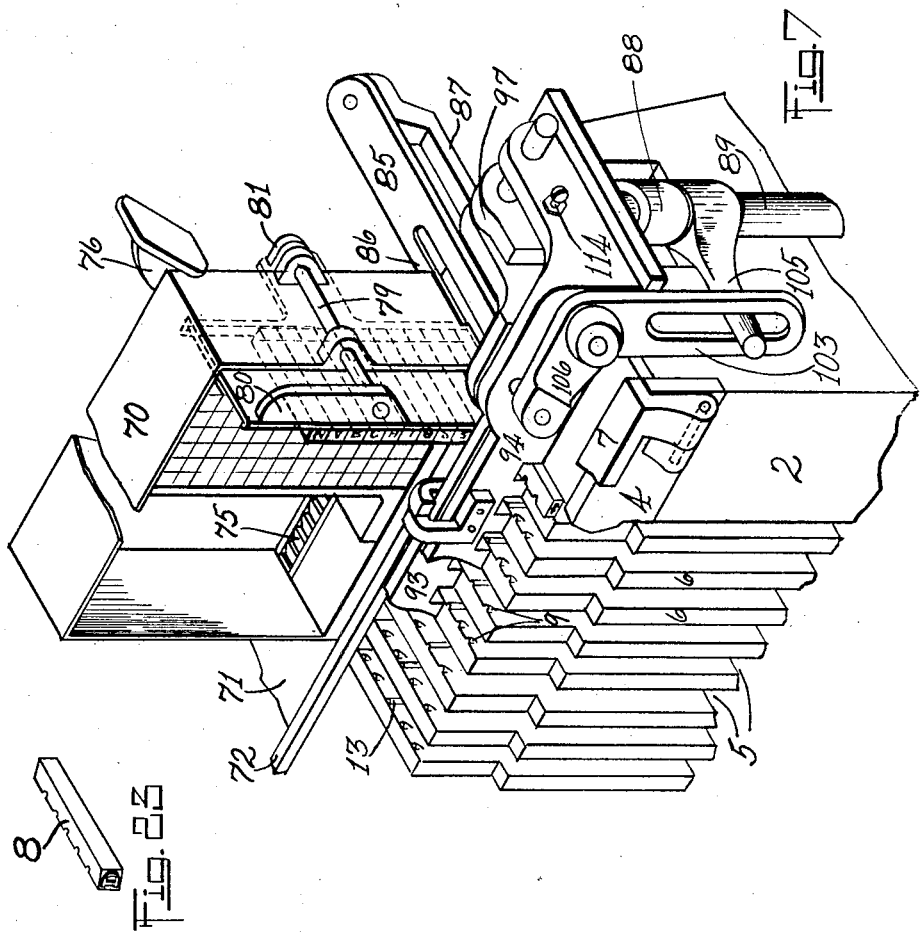

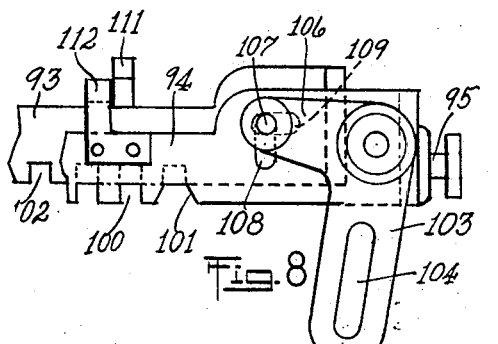
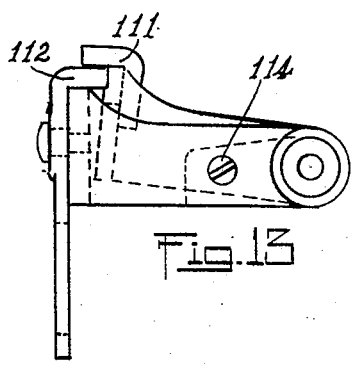
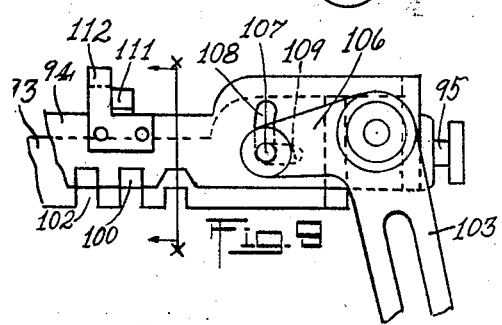
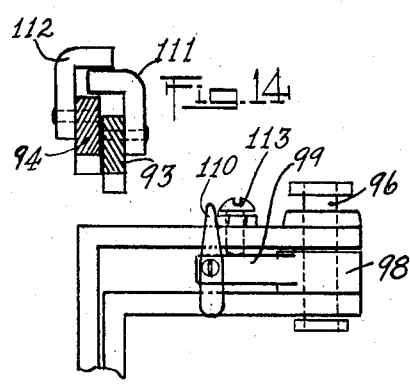
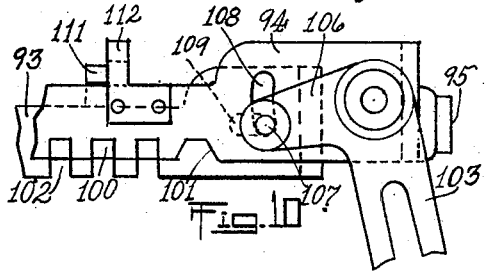
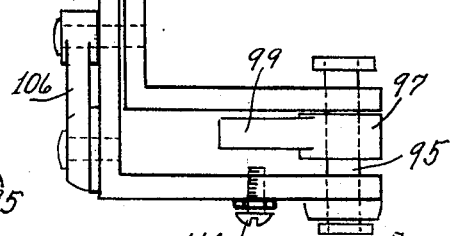

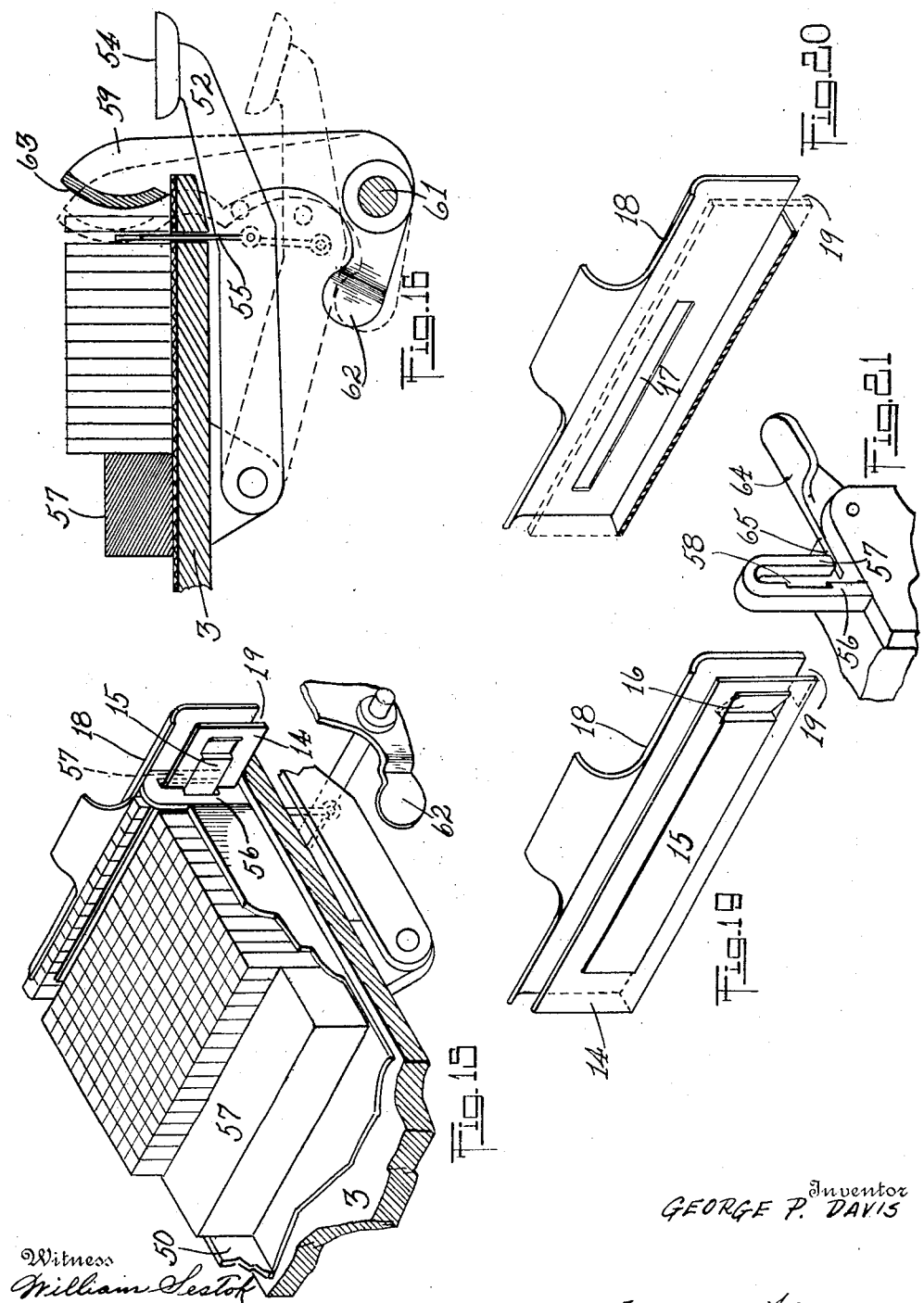

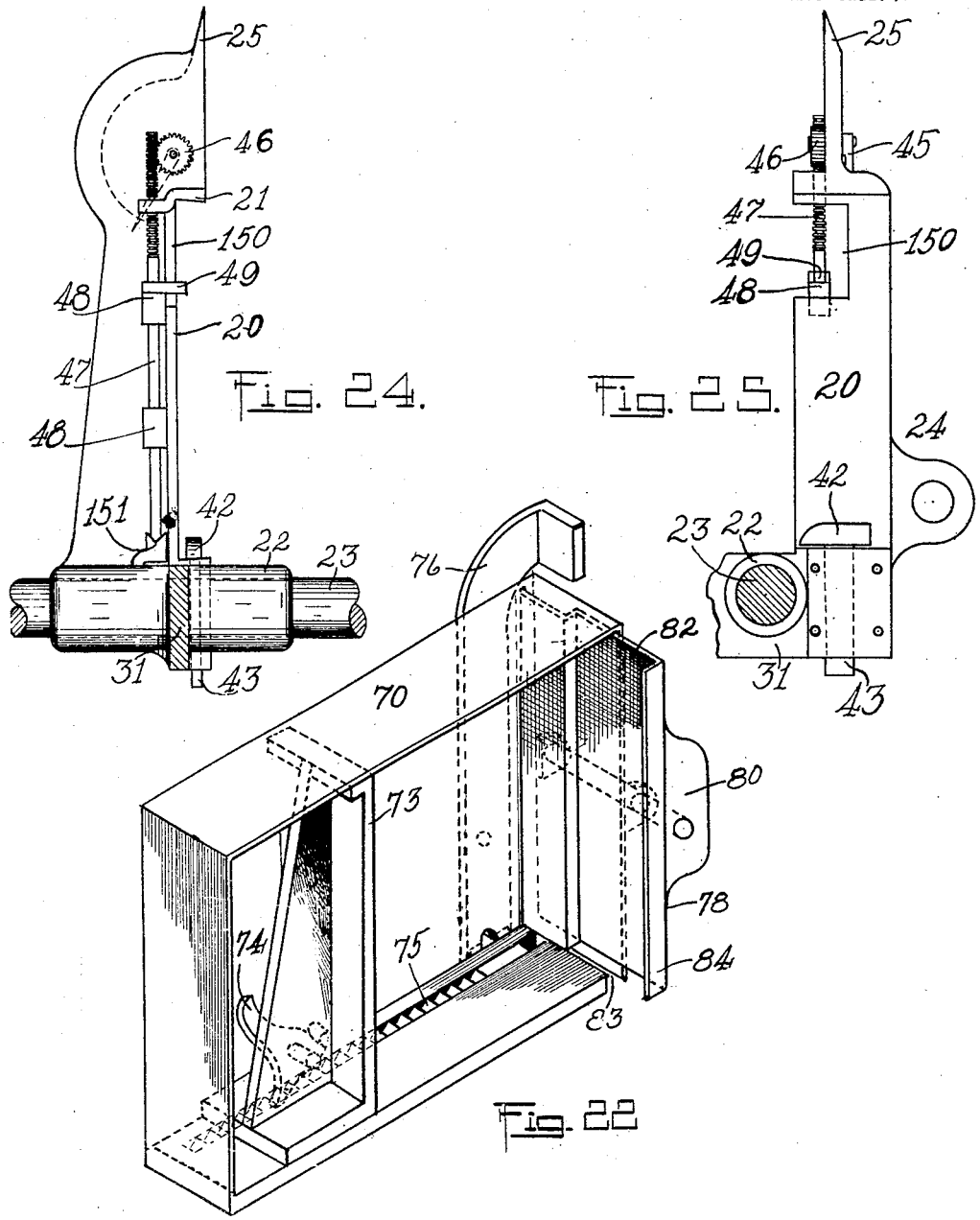

GEORGE P. DAVIS, OF FRESNO, CALIFORNIA.

TYPESETTING-MACHINE.

1,350,707.

Specification of Letters Patent.   Patented Aug. 24, 1920.

Application filed December 12, 1918.   Serial No. 266,376.

*To all whom it may concern:*

Be it known that I, GEORGE P. DAVIS, a citizen of the United States, residing at Fresno, county of Fresno, State of California, have invented a certain new and useful Improvement in Typesetting-Machines, and declare the following to be a full, clear, and exact description of the same, such as will enable others skilled in the art to which it pertains to make and use the same, reference being had to the accompanying drawings, which form a part of this specification.

This invention relates to typesetting machines, and its object is to provide a simple and inexpensive device for the simultaneous setting and distributing of type. A further object is to provide a small, light and compact hand-operated machine by means of which a person may set a line of type without having had previous experience in the handling of type and compose the same in a form. With these objects in view the machine includes a receiving channel for each different character of type and a carrier for a stick movable to position relative to each of the channels and mechanism for ejecting the type from any of the channels into the stick, and further includes a distributing mechanism actuated by the setting mechanism to distribute type from "dead matter" to the respective channels therefor. The various novel features of the invention are involved in the construction of the stick, carrier, ejecting and distributing mechanism and composing mechanism and means for rectifying each line of type as positioned in the composing form. These and other objects and various structural features and advantages of the invention will become more apparent from the following description taken in conjunction with the accompanying drawings showing the preferred form of the invention.

In the drawings—

Figure 1 is a front elevation partly broken away of a typesetting machine embodying my invention.

Fig. 2 is an end elevation thereof.

Fig. 3 is an elevation taken from the opposite end, with parts thereof in section.

Fig. 4 is a vertical section on an enlarged scale showing the ejecting mechanism for taking the type from either of the several columns in the desired order and setting it into a stick.

Fig. 5 is a front elevation of said means.

Fig. 6 is a detail in perspective of part of said means.

Fig. 7 is a perspective view of the mechanism utilized in distributing the type.

Figs. 8, 9, 10 and 11 are details of a part of the type distributer showing the mode of operation thereof.

Fig. 12 is a plan view of the type distributer.

Fig. 13 is an end view of the type distributer.

Fig. 14 is a section taken on line $x$—$x$ of Fig. 9.

Fig. 15 is a detail in perspective of the form and mechanism used in stripping the type from the stick into the form.

Fig. 16 is a section thereof showing the operation.

Figs. 17 and 18 are plan and side views respectively of the receiving form.

Fig. 19 is a perspective view of the stick used in the carrier.

Fig. 20 is a longitudinal section thereof.

Fig. 21 is a detail of part of the stripping mechanism.

Fig. 22 is a perspective view of the form for receiving the "dead matter."

Fig. 23 is a detail in perspective of a type.

Fig. 24 is a detail in rear elevation of the carrier.

Fig. 25 is an elevation taken from the right side of Fig. 24.

The device consists of a frame comprising the end members 1 and 2 spaced apart as will be understood from Figs. 1, 2 and 3 and connected near the base by the angularly positioned member 3 extending across the front thereof providing a form or galley in which the lines of type are placed after being set in the holder as hereinafter described. The frame members are also connected at the upper end by a cross bar 4 extending across the front of the machine, as will be understood from Fig. 1, and a series of vertical channels 5 are formed across the front of the machine by means of the spaced vertical members 6, a detail of which is shown in Fig. 7. These channels are open at the upper end as will be seen from the drawings, and the bar 4 is provided with a hinged stop 7 slightly higher than the upper ends of the members 6 and the type are moved across the upper ends of these members in distribution of the same. It will be noted in this connection that the type 8 are provided with notches on one side as shown in Fig. 23, all the type bearing the same character being notched in the same manner, and also that the upper ends of the vertical members 6 are provided with lugs 9 adapted to engage the notches 8 of the type, the lugs 9 of one member 6 being differently spaced from the lugs of the other members to correspond with the differently notched type. Thus in passing of a type across the upper ends of the channels it may move freely thereacross until in alinement with the respective channel having a member provided with lugs registering with the notches of the type. The distribution of the type and manner of movement of the same across the upper ends of the channels is more fully described hereinafter.

The members 6 are connected together at the lower end by means of a bar 10 extending from one end member of the frame to the other and, if desired, this bar may be notched as indicated in Fig. 1 to receive the ends of the members in the desired spaced relation to form the type channels. The method of securing the member 6 to the bar, however, is immaterial as the members may be secured to the bar 10 by soldering the same in place on the bar, spacers 11 being positioned on the bar 10 between the members 6. At the lower end each of the members 6 is provided with a transverse shoulder 12 on opposite sides thereof as shown particularly in Figs. 1 and 6 and the two oppositely positioned shoulders in each channel provide a support for the type resting therein, and the channels are preferably open at both the front and rear as will be understood from the drawings. To prevent the type from displacement in the channels, each member 6 on opposite sides is provided with a rib 13 extending nearly the full length of the member but spaced from the shoulders 12, as shown in Fig. 6, a distance slightly greater than the thickness of a type so that the lowermost type in each column may be moved longitudinally out of the channel.

The mechanism for setting a line of type is shown more particularly in Figs. 1, 3, 4, 5 and 6, and the stick for receiving the type as set is shown in Figs. 19 and 20. The stick 14 consisting of a sheet metal member bent substantially to U shape form as shown in Fig. 19, one leg of the U being provided with a flat spring member 15 secured on the outside thereof and having a rebent portion 16 projecting into the space between the side members of the stick through an aperture provided in the supporting member, and providing a support for the type as is hereinafter shown. The opposite side member of the stick as is indicated in Fig. 20 is provided with a longitudinal slot 17 therein for a purpose hereinafter described, and the upper and outer edge 18 is turned inwardly over the space between the side members preventing displacement of the type set therein. It is further to be noted that the back portion of the stick is cut out at the lower end providing a notch 19. This stick is adapted to be supported in a carrier 20 indicated in Figs. 1 and 5, and the carrier is shaped on one side to receive the stick which is moved thereinto from the front as will be understood from the said figures. The upper end of the support for the stick is preferably undercut as indicated at 21 and the upper end of the stick is likewise shaped so that when moved or positioned therein as indicated in Fig. 5, the stick is retained from material lateral displacement. The stick is placed in the carrier with the back thereof toward the type channels and the opening 19 is at the lower end providing a space through which type are inserted from the channels. The carrier 20 is provided with a comparatively long boss 22 slidable on a rod 23 extending between the end members of the frame and is also provided with a hand hold 24 by means of which the carrier may be readily moved longitudinally of the rod 23 in front of the type channels. The upper end of the carrier frame 20 is shaped to provide a pointer 25 riding in cross relation with a graduated bar 26 above which are the characters and letters 27 of the alphabet, there being a letter or character for each pair of channels 5 in one of which pair of channels is carried the upper case type and in the other of which is carried the lower case. The stick is so positioned on the carrier that when the pointer is on one of the graduation marks (as for instance the long mark 29) the stick is positioned directly in alinement forward of the channel carrying the upper case type and, when moved to the shorter graduation 30, the stick is positioned in alinement with the channel carrying the lower case type. The position of the stick and carrier relative to the type channel is shown more clearly in Fig. 4.

The carrier 20 at the bottom is provided with a rearwardly extending frame portion 31 which is notched as indicated at 32 at the back to engage over a rod 33 supported in the end frames. At the left side of the machine this rod is provided with an actuating lever 34 by means of which the bar is turned. This bar 33 has a U-shaped member or stirrup 35 connected therewith as indicated, and the longitudinal portion of the stirrup is engaged by the slotted end 36 of a lever 37 pivotally mounted on the base member of the carrier. This lever 37 has an arm 38 extending forwardly beneath the carrier and an arm 39 extending upward back of the channel members 6. At the rear of the channels the base portion 31 of the carrier above the rod 33 supports a longitudinally reciprocable member 40 being preferably grooved to receive a member in the upper edge. This member 40 is connected by means of a link 41 to the end of the arm 39. The normal position of the lever 37 is shown in Fig. 3 and by dotted lines in Fig. 4. On the depression of the lever 34 at the end of the machine, the rod 33 is turned which turns the stirrup 35 and the lever 37 on its pivot to the position shown in full lines in Fig. 4. This movement of the lever moves the extractor 40 through the channel behind which it is positioned, forcing the lowermost type into the stick through the aperture 19 at the bottom thereof.

In order to avoid necessity of exact positioning of the pointer relative to graduated lines on the bar 26, the rear of the channels adjacent the position of operation of the extractor 40 are provided with triangular guide blocks 66 as indicated more clearly in Fig. 6 providing a wide throat or opening to the channels. Thus the member 40, which is carried by the carrier in fixed position relative to the pointer, has considerable latitude in positioning either side of the longitudinal center of any type channel and will be guided into the channel even though it may be positioned opposite one side or the other of the channel. By this arrangement, on movement of the member 40 toward the channel and between the triangular blocks, the said member 40 is automatically centralized relative to the channel which thus allows some latitude in the positioning of the carrier.

This rod 33 (although not here shown) is spring controlled to return it to normal position after operation which return movement causes withdrawal of the bar 40 from the type channel allowing the type therein to fall, the lowermost type then occupying the position previously occupied by the extracted type. The first movement of the lever 34 therefore pushes the type out of the channel into the lower part of the stick through the said aperture 19 therein and below the portion 16 of the spring retainer. The carrier at the point occupied by the bottom of the stick is provided with a positioning block 42, the channel end of which is curved on the upper side of the end toward the channels as indicated by dotted lines in Fig. 4 so that the type is unobstructed in its movement from the channel into the stick and finally rests thereon with the end of the type engaging against the curved edge 18 of the stick providing a stop therefor. The block 42 is provided with a depending bar 43 extending downward through a channel provided at the front end of the base member 31 as indicated in Figs. 4 and 5 with the lower end in position to be engaged by the end of the arm 38 of the lever 37 when returned to normal position as shown by dotted lines in Fig. 4. This movement caused by the spring on the rod 33, forces the block 42 upward carrying the type therewith to position behind the shoulder 16 of the spring member 15 of the stick. On a succeeding downward movement of the actuating lever 34 the end 38 withdraws from engagement with the bar 43 allowing the block 42 and bar to fall to position for receiving a succeeding type. This block 42 also serves to retain the stick from sidewise displacement at the lower end when in position on the carrier and the aperture 19 in the stick is of sufficient length to allow the insertion of a type when the block is in its lowermost position as shown in Fig. 4. This carrier 20 and integral part 31 and levers mounted thereon, is moved as a unit backward or forward across the front of the channels by the right hand of the user who positions it by means of the pointer relative to the channel carrying the desired character of type and the lever 34 then is depressed and released. This action of depressing and automatic return of the lever 34 to normal position automatically forces the type from the channel and to position in the stick above the supporting spring 16 and between each actuation of the lever 34 the carrier may be moved to position in front of any desired channel as will be readily understood.

At the upper end of the carrier member 20 adjacent the pointer is provided an indicator 44 carrying a series of numbers from 0 to 10 in a semi-circular position by means of which the operator may know at a glance the number of ems or points required to complete the line of type being set. This indicator is provided with a pointer 45 having a shaft on which is a gear 46 meshing with a rack 47 on the back of the carrier. The rack may be moved vertically in guides 48 provided on the carrier and has a finger 49 that, when the stick is in place, projects through the slot 17 therein and is thus in position to be engaged by the uppermost type as the line is built up to engage therewith. Thereafter, as each succeeding type is positioned, the pointer 45 is carried from the highest toward the lowest number on the indicator whereby the operator may know at a glance the number of points required to complete the line. The finger 49 projects into the space for the stick through an aperture 150. The rack teeth are formed by circumferential grooves on the upper end allowing the rack to be turned while in mesh with the gear 46. On moving the stick into its space on the carrier, the finger 49 is turned until it engages in the slot 17, whereupon it returns to normal position due to its resting in a V shaped notch 151 at the lower end, the rack being correspondingly shaped. The turning of the rack twists the end in the notch 151 slightly raising the same and, as the finger engages in the slot 17, the weight of the rack resting in the V groove causes it to assume normal position. Withdrawal of the stick likewise first turns the rack as the finger 49 withdraws from the slot. The lower end of the stick, is held against lateral displacement by the block 42 which retains the stick in correct position.

The lines are to be set up in a composing form 50 indicated in Figs. 1, 15, 16, 17 and 18. This form is supported on the cross member 3 extending across the front of the machine and is provided with the upright side members spaced a distance apart equal to the length of a set line as will be understood from Fig. 15. This form is open at the forward end and is also provided with a block 57 providing a support for the type as they are positioned therein, the block being slidable in the form and of sufficient weight to support the type. At the right hand end of the member 3 is provided a pair of levers 52 and 53 connected by a bar 54 by means of which the levers may be depressed from normal position. These levers are pivotally supported at the inner ends on the cross member 3 as will be understood from Fig. 16 and carry therebetween a thin metal plate 55 that may ride in a slot provided at the right hand end of the member 3. Also at this end of the member 3 is provided an upwardly extending U shaped member 56 having a downwardly depending finger 57 spaced from the said body 56, and providing a slot between the finger and the body which is notched at 58 as shown in Fig. 1. The composing form is positioned with a forward lower edge thereof engaging against this member 56 and the plate 55 normally extends upward through the cross bar 3 and through a slot formed in the bottom member of the form as will be understood from Fig. 16.

There is a second pair of levers 59 and 60 positioned at the right hand end of the cross member 3 pivotally supported on a rod 61 extending between ears formed on the depending side member of the cross member 3. These levers 59 and 60 each have a portion 62 extending beneath the cross member 3 in position to be contacted by the lower edge of the levers 52 and 53 respectively at about the finish of their downward movement. These levers 59 and 60 at the upper end are connected by a curved bar 63 which when in normal position as shown in Fig. 1, is spaced from the plate 55 when in its normal position, thus providing a type receiving channel therebetween at the lower end of which lies the finger 57. The lower end of this finger 57 is slightly above the surface of the bar 3 and when the stick has been filled, the stick with the type therein is introduced into this channel at the upper open end and moved downward therethrough, one leg or side member of the stick passing through the slot in the lug 58 after the manner shown in Fig. 15 and, by continued movement of the stick downward through the channel, the type are stripped from the stick by means of this finger 57 leaving the line of type in the position shown in Fig. 16 between the plate 55 and the cross bar 63.

In introducing the type into the stick as is heretofore stated, the number of ems required to complete the line is indicated by the indicator 43 and, if the line is incomplete, it is completed by means of quads which are introduced at the lower end of the stick and lie adjacent the finger 57 when the type have been stripped from the stick. After stripping the line may be rectified by spacing the wording or letters by means of the quads and these may be picked from the position in the line by means of a lever 64 pivoted to the side member of the bar 3 and having a part 65 comparatively narrow in width positioned in a slot in the end of the bar. By depressing this lever 64 this end 65 is raised upward raising the lowermost quad of the line to position to be readily withdrawn and manually placed in new position in the line.

After the line has been rectified it may be set with the matter in the composing form by depression of the bar 54. The first downward movement of the bar withdraws the plate 55 from between the rectified line and the set up matter in the form and thereafter, upon engagement of the levers 52 and 53 with the ends 62 of the levers 59 and 60, the said levers are moved forward carrying the bar 63 forward over the end of the table and moving the line of type bodily to engagement with the set up matter and moving the entire matter with the new line back of the slot in the table. Release of the bar 54 allows the bar to be returned to normal position by means of a spring (not here shown) bringing the plate again to position forward of the set up matter. The levers 59 and 60 also return to normal position upon release of the bar 54 providing a channel between the plate and the bar 63 for introduction of a succeeding line of type.

From the above description it is evident that the device is easily operated, accurately setting each line of type simply by the movement of the carrier and stick across the face of the type channels and depression of the lever 24 after each movement of the carrier and thus a person even inexperienced in the setting of type by hand and unacquainted with the typesetter's profession may readily handle all character of type within the capacity of the device, setting it accurately a line at a time and thereafter accurately setting the successive lines in the form from which it may be taken in any approved manner and locked in a form for use in a press.

The foregoing description relates principally to the manner and means for setting the type. The device also automatically redistributes type from "dead matter" during the setting up operation, and this distribution of type is accomplished by the following described mechanism:

The "dead matter" is placed in a receiver 70, which is detachable from the machine, and is adapted to be placed on the upper end thereof on the cross bar 71 positioned at the rear of the upper ends of the type channels 5. The bar 71 is provided with a ledge 72 at the forward edge by means of which the position of the receiver may be determined. This receiver is shown in perspective in Fig. 22 and, as is there shown, is box like in form and open on the forward side. A slidable follower member 73 is provided therein, and this follower has a latch 74 extending through an aperture in the foot thereof in engagement with a rack 75 slidable in the bottom wall of the receiver. The latch 74 is pivoted to the follower and spring controlled to hold the point thereof in engagement with the rack. The rack is reciprocable by means of a pivoted lever 76 being connected with the rack at the lower end, and the normal position of the lever is shown in Figs. 7 and 22. The rack by movement of the lever to the left, draws the follower forward for the purpose hereinafter stated.

At the front end of the box is a sliding transfer member 78 of a length equal to the width of the box and the member is supported by means of a rod 79 riding in lugs on the outer side of the box as shown in Fig. 7 and secured to the forward lug 80 on the slide and rearward lug 81 on a rearwardly projecting portion. This sliding member has a vertical channel 82 the full length thereof and of a width equal to the length of the type and into which an entire line of type may be moved by operation of the lever 76 when the sliding member is pushed backward into the receiver to its receiving position. The forward lug 80 on the member is adapted to be grasped by the hand of the operator and moved forward to position shown in Fig. 7 to bring a line of type to position for distribution. It is to be noted that the transfer member 78 is positioned directly over a slot 83 in the lower side member of the receiver 70 and when the lever 76 is operated and a line of type moved into the channel 82 of the transfer member, the lowermost type will drop down into this aperture 83 onto the upper plate 71, the surface of which is on a level with the upper ends of the type channels 5. The lowermost type will therefore be below the front edge 84 of the transfer device 70 which holds the line of type in position preventing endwise movement thereof except this lowermost type which is to be moved forward over the type channels by an ejecting mechanism.

The ejecting mechanism consists of a member 85 having a finger 86 reciprocable in this slot 83 of the receiver. This ejector bar 85 is pivotally mounted on a link 87, the inner end of which link is pivotally connected to an arm 88 secured to a vertical rod 89 mounted on the end member 2 of the machine. This rod 89 has an arm 90 at the bottom thereof connected by means of a link 91 with an arm 92 on the shaft 33. This shaft, as heretofore mentioned, is turned by means of a lever 34 to eject type from a channel into the stick and thus by the mechanism described also turns the shaft 89 and ejects a type from the transfer device to position over the channels. Therefore, each time a type is set up in the stick a type is distributed.

As has been heretofore stated, the upper ends of the channels are provided with lugs, each channel being thus keyed for a particular type notched to correspond with the lugs so that it may drop into a channel therefor. Therefore a type which is projected over the top of the channels at the right hand side of the machine is necessarily moved across the upper ends of the channels until it arrives at that channel in which the lugs match the notches in the type whereupon it drops into the channel.

Mechanism is provided to move the type step by step across the upper ends of the channels, and this mechanism is shown in Figs. 1 and 7 to 14. The mechanism consists of two U shaped frames 93 and 94, one lying within the other as is indicated in plan view in Fig. 12 and both pivotally mounted upon the same short shafts 95 and 96. These shafts are each carried in lugs 97 and 98 respectively carried on the upper ends of the frames 1 and 2, and these hubs or lugs are provided with forwardly projecting stop members 99. The outer frame 94 is adapted for longitudinal movement on the shafts and also pivots thereon while the inner frame 93 is immovable longitudinally but is pivoted on the shafts, and both the longitudinal connecting members of the legs are notched as indicated at 100 and 102, the notches each being of a size to receive a type. These notched bars extend across the machine over the upper ends of the type channels as will be readily understood, and a channel is provided into which these type channels open at the upper end formed by the bar 72 at the rear edge of the upper end of the type channels and the hinged bar 7 across the front edge thereof. This horizontal channel is of a width equal to the length of a type allowing the type to be moved longitudinally of the machine.

When the bar 34 is depressed actuating the ejector 85, a type is pushed forward into the rearmost notch 101 of the transfer bar 94. This bar as is shown in Fig. 8, at the time of introduction of a type over the channels is in engagement with the upper ends of the type channels, and the bar 93 is raised to its uppermost position with the notch 102 directly over the placed type. This type, if not keyed for the end channel over which it is introduced, remains in position on the upper end of the said channels. The position shown in Fig. 8 is the normal position assumed after release of the lever 34 and these bars are actuated by a bell crank 103 pivoted to the end of the longitudinal part of the member 94. The lower depending arm of the bell crank is provided with a slot 104 into which projects an arm 105 attached to the vertical rod 89 so that as the rod is turned by actuation of the horizontal rod 33, this arm 103 is turned toward the right of the Fig. 7 after the manner shown in Fig. 1. The other arm 106 of the bell crank has a pin 107 therein projecting through a vertical slot 108 in the bar 94 and into a horizontal slot 109 in the bar 93. From the position shown in Fig. 8, therefore, the first movement of the rock lever 105 turns the bell crank on its pivot bringing the pin 107 to the bottom of the slot 108 and, by reason of the engagement of the pin in the slot 109, brings the bar 93 to downward position with the end notch 102 over the inserted type. These two bars 93 and 94 are limited in their pivotal movement on the shafts 95 and 96 by means of a bar 110 secured to the tongue 99 as shown in Fig. 12. This tongue 99 is built up at the end to receive the bar 110, the lower surface of which is engaged by the bar 93 or 94 on the upward travel thereof, which travel is sufficient to allow either bar to raise a distance slightly greater than the thickness of the type, and the bars naturally are limited in their downward movement by the type channels over which they are positioned. In the movement of the bell crank arm to the right in Fig. 8, as above described, and the bar 93 brought to its lowermost position over the type and in engagement with the upper end of the type channels, the pressure exerted by the lever 105 in the slot 104 causes the bar 94 to raise to position shown in Fig. 9 for the reason that the pin 107 may not longer be moved downward thus holding the end of the arm 106 and allowing the pivot point to raise as is indicated. The extent of raising as before stated, is determined by the bar 110 and when the bar 94 has engaged this bar 110 and can no longer raise farther the pressure, causes an endwise movement of the member 94 bringing the notch 101 to position shown in Fig. 10 and with the second notch 100 directly over the inserted type which, during this movement of the bar 94 is held in position by the bar 93. On release of the lever 34 which has caused the above movements, the return of the parts to normal position first causes the bar 94 to drop to position shown in Fig. 11 with the type engaged in the second notch. Continued movement will cause the bell crank to turn on its pivot raising the bar 93 to position shown in Fig. 8 in which position it engages against the bar 110, thereupon further and final turning of the bell crank will cause an endwise movement of the bar 94 moving the type carried thereby one space which is the extent of longitudinal movement of the bar 94. It is thus to be seen that the bar 94 actually transfers the type step by step across the channel and that the bar 93 merely holds the type in position during the time that the bar 94 is out of engagement therewith.

As a precautionary measure I provide two bent lugs 111 and 112 on the bars 93 and 94 respectively, which lugs have ends bent toward each other as indicated in Figs. 12, 13 and 14. The ends of these lugs are square equal to the size of a type and notch in the bars, and the purpose of these is to insure proper movement of the lever downward to cause the necessary travel of the type. For instance, take the position shown in Fig. 10. On movement of the bell crank to the left on its pivot, the first movement of the bar 93 is downward causing the lug 112 to move vertically along the face of the bar 111 as is shown in Fig. 11 and thereupon the bar 93 raises to position shown in Fig. 8 a distance slightly greater than the thickness of the type, and in this position the end of the lug 112 may pass beneath the lug 111. Then the movement is to position shown in Fig. 9 raising the bar 112 vertically along the side of the bar 111 and allowing the said bar 112 to be moved over the top of the bar 111 to position shown in Fig. 10. These lugs thus provide a guide to determine the extent of travel of the bar 94 and insure a complete movement being made at each actuation.

I have also provided set screws 113 and 114 in the legs of the member 94 which, on endwise movement of the member 94, engage the lugs 99 provided on the boxes for the shafts 95 and 96 and thus the movement of the bar may be limited to that required to move a type from the open end of one channel to the open end of a succeeding channel. As will be understood, each complete movement of this mechanism introduces a type into the distributer bars and several type may be moved by the bars at a time. Each type as it comes to position over the channel keyed therefor drops into the channel and there are as many notches in the bar 93 as there are channels while there is one extra notch 101 in the bar 94.

The movement of the bar 94 being limited in the manner stated limits the extent of movement of the operating lever 34 and the levers for operating the ejecting bars 40 and 86 are designed to perform their function within this limit of movement of the lever 34.

In operation "dead matter" is first set in the receiver 70 therefor and the lever 76 operated to move a line of type into the transfer plate 78. This transfer plate is then drawn outward to position shown in Fig. 7 allowing the lowermost type to drop in front of the ejector finger 86. The machine is then ready to set up and distribute the type simultaneously by actuation of the lever 34. The ejector 40 moves the type from any of the channels in front of which the stick 14 is positioned by the carrier 20. At the same time a type is ejected into the notched distributer bars. Release of the lever 34 withdraws the ejector 40 from the position indicated by full lines in Fig. 4 and also withdraws the ejector 86 from beneath the line of type in the transfer plate. The carrier is then moved to another channel and another type injected into the stick carried thereby and another type is injected into the notched distributing bars and this operation is continued until a line of type has been set in the stick including the quads for completing the line and upon completion of the line, the line of type in the transfer device has been distributed into the distributing bars. Thereupon the transfer device is moved backward into the receiver case 70 the lever 76 operated which, through operation of the notched rack therein moves the follower forward and places a second line of type in the vertical channel of the transfer device which then may be moved again forward to position shown in Fig. 7 for distribution of a second line. The stick after the line has been set therein is removed from the carrier and positioned on the composing form by being stripped from the stick in the manner described and shown in Fig. 15. The line is then rectified by means of the pickup lever 64 and the rectified line then set in the composing form after the manner heretofore described.

From the foregoing description it is believed evident that the device is comparatively simple in form and type may be correctly set by one inexperienced in the handling of type, and that the several objects of the invention mentioned herein are attained in a simple and efficient construction little liable to disarrangement, and that fully as efficient work may be accomplished by this small and compact machine (not much larger than a typewriter and no greater in weight) as can be accomplished by the heretofore known devices of this character which are usually large and complicated and cumbersome in form.

Having thus fully described my invention, what I claim is—

1. In a typesetting and distributing machine, a series of type channels each individually keyed to receive similarly keyed type, a holder for a block of "dead matter", mechanism for distributing type to the channels, a type receiver movable across the machine, mechanism adapted to eject a type at a time from any channel into the receiver, and mechanism operable with said ejecting mechanism adapted to discharge a type at a time from the "dead matter" holder to the distributing mechanism.

2. In a typesetting and distributing machine, a series of type channels each individually keyed to receive similarly keyed type, a holder for a block of "dead matter", a distributing mechanism adapted to move a type across the upper open ends of the channels, a type receiver for receiving the type, mechanism for ejecting a type from the lower end of any of the channels at will into the receiver and simultaneously eject a type from the "dead matter" holder into the distributing mechanism.

3. In a typesetting and distributing machine, a series of type channels each individually keyed to receive similarly keyed type, a holder for a block of "dead matter", a distributing mechanism adapted to intermittently move type in succession across the upper open ends of the channels, a setting up mechanism movable adjacent the lower ends of the channels, a stick carried thereby, means operable at will for ejecting the type from the lower end of any predetermined channel into the stick, and mechanism operable with said ejecting mechanism adapted to discharge a type at a time from the "dead matter" holder to the distributing mechanism.

4. In a typesetting and distributing machine, a series of type channels each individually keyed to receive similarly keyed type, a holder for a block of "dead matter", a distributing mechanism adapted to intermittently move type in succession across the upper open ends of the channel, a setting up mechanism movable adjacent the lower ends of the channels, mechanism for ejecting a type from the lower end of any of the channels into the receiver, mechanism for ejecting a type at a time from the holder for "dead matter", and manual means for simultaneously operating the ejecting mechanism of the receiver and of the holder for "dead matter".

5. In a typesetting and distributing machine, a series of vertically positioned type channels arranged in parallel relation, each individually keyed to receive similarly keyed type, a holder for a block of "dead matter", a distributing mechanism adapted to intermittently move type in succession across the upper open ends of the channels, a setting up mechanism movable at will adjacent the lower ends of the channels, an index whereby the setting up mechanism may be positioned to receive type from any predetermined channel, an ejector for ejecting the type from the lower end of the channel into the setting up mechanism, and an ejector operable therewith for ejecting the type from the "dead matter" holder to the distributing mechanism.

6. In a typesetting and distributing machine, a series of vertically arranged type channels open at the upper end and each individually keyed to receive similarly keyed type, a case for holding a block of "dead matter" mounted adjacent the upper ends of the channels, a distributing mechanism adapted to move type into succession across the upper open ends of the channels, the type being adapted to fall by gravity into the channels, a setting-up mechanism manually movable across the channels adjacent the lower ends, an index whereby the mechanism may be positioned for receiving type from the predetermined channel into the setting-up mechanism, mechanism simultaneously operable to eject a single type from the "dead matter" holder to the distributer, the ejecting mechanism of the "dead matter" holder being adapted to discharge a type at a time until a line of "dead matter" has been ejected and to thereupon position a succeeding line of type for discharge by the ejector.

7. In a typesetting and distributing machine, a series of vertically positioned type channels open at the upper end and each individually keyed to receive similarly keyed type, the setting-up mechanism comprising a receiver movable across the machine adjacent the lower ends of the tubes and mechanism for ejecting type from any channel at will into the receiver, a distributing mechanism adapted to move type step by step across the open ends of the channels, a case for holding a block of "dead matter", an ejecting mechanism adapted to eject a type at a time from a line of the case of "dead matter" to the distributing mechanism, means for operating the distribution mechanism arranged to be jointly operated with the ejecting mechanism for the setting-up device and "dead matter" holder.

8. In a typesetting and distributing machine, a series of vertically positioned type channels open at the upper end, each individually keyed to receive similarly keyed type, a horizontal channel into which said tubes open, a distributing mechanism consisting of a pair of similarly notched bars alternately movable vertically and one of said bars being movable horizontally in alternate directions whereby a type inserted in a notch may be moved intermittently across the open ends of the channels, a case for holding "dead matter" mounted adjacent one end of the distributing bars, ejecting mechanism adapted to successively eject a type from the "dead matter" case into the distributer, a setting up mechanism manually movable across the machine adjacent the lower ends of the type channels, an ejector carried thereby adapted to eject type from any one of the channels into the receiver, and mechanism for simultaneously operating the said ejectors for the type channels and for the "dead matter" holder respectively and the distributer bars.

9. In a typesetting and distributing machine, a series of vertically positioned type channels keyed to receive similarly keyed type whereby type of single character may enter the channel for that character only, a horizontal channel extending across the type channels into which the said type channels open, a case for holding a block of "dead matter," a pair of bars in the said horizontal channel having similarly notched lower edges, one of said bars being reciprocable horizontally and alternately in the opposite relation, and both bars being pivoted on a horizontal axis, an ejector mechanism for the "dead matter," a holder adapted to eject a type at a time from a line of the "dead matter" into a notch of the bars at one end thereof, the reciprocable movement of the bars moving the type notch by notch across the open ends of the type channels, the said ejector operating upon a single line of type at a time, and means for bringing lines of type in succession to position for actuation by the ejector.

10. In a typesetting and distributing machine, a series of vertically positioned type channels open at the upper end, each keyed to receive similarly keyed type, mechanism for automatically distributing type from a block of "dead matter" to the said channels down which they are adapted to feed by gravity, a typesetting mechanism manually movable across the machine, an index for positioning the receiver in relation to any of the channels to receive a type therefrom, said index consisting of lines and letters for each channel whereby the setting-up mechanism may be positioned to receive the desired type, a stick carried by the setting-up mechanism and adapted to receive type, an ejector carried by the setting-up mechanism horizontally movable across the lower ends of the said channels and adapted to eject a type from any desired channel into the stick, manual means for operating the ejector, and an indicator by means of which the length of line in the stick may be determined, said indicator consisting of a pointer movable across a dial by introduction of type into the stick.

11. In a typesetting and distributing machine, a series of vertically positioned type channels, means for ejecting type from the lower ends of any of the channels at will, a setting-up device for running the type, a horizontal channel extending across the upper open ends of the type channel, a pair of bars similarly notched in the lower edge, one of said bars being reciprocable alternately in opposite directions and both being movable vertically in alternate relation, a case for holding a block of "dead matter" mounted adjacent the said horizontal channel, means in relation to the said case whereby a line of "dead matter" may be set forward of the surface of the position occupied by the block of "dead matter," an ejector adapted to eject a type at a time from the said forwardly positioned line of type into the distributer mechanism, the said bars being operable intermittently to produce a step-by-step movement of the type across the channel into which they may fall by gravity, means connected with the line advancing means of the case whereby on operation preparatory to advancing a new line of type the block of "dead matter" is moved forward in the case to position a line thereof for advancement by the said advancing means.

12. In a typesetting and distributing machine, a series of vertically positioned type channels, means for ejecting type from the lower ends of any of the channels at will, a setting-up device for receiving the type, a horizontal channel extending across the upper open ends of the type channel, a pair of bars similarly notched in the lower edge, one of the bars being reciprocable alternately in opposite directions and both being movable vertically in alternate relation, a case for holding a block of "dead matter" mounted adjacent the said horizontal channel, means in relation to the said case whereby a line of "dead matter" may be set forward of the surface of the position occupied by the block of "dead matter," an ejector mechanism adapted to eject a type at a time from the said forwardly positioned line of type into the distributer mechanism, the ejector mechanism of the setting-up device and of the distributing device being jointly operable, the said bars being operable intermittently to produce a step-by-step movement of the type across the channel into which they may fall by gravity, means connected with the line advancing means of the case whereby on operation preparatory to advancing a new line of type the block of "dead matter" is moved forward in the case to position a line thereof for advancement by the said advancing means.

13. A typesetting and distributing machine, a series of vertical type channels positioned in parallel relation in a row, a horizontal channel extending across the upper open ends of the type channels into which the said channels open, a type distributing mechanism consisting of a pair of bars positioned in a horizontal channel having similarly notched lower edges, means for reciprocating one of the bars longitudinally and alternately in opposite directions and moving the two bars vertically in alternate relation whereby type in succession may be moved intermittently across the open ends of the channels, said channels being keyed to receive similarly keyed type, a case adapted to hold a block of "dead matter" adjacent one end of the said horizontal channel, an ejector mechanism operable jointly with the distributing bars adapted to eject a type at a time intermittently into the notches when in registration, a manually operable transfer device for moving a complete line of type from the block of "dead matter" to position for operation by the ejector, a follower in the case for positioning the block of type, the follower being adapted to move the block of "dead matter" toward the transfer device and place the foremost line of type in the transfer device, the type ejector and the distributing bars being jointly operable.

14. In a typesetting machine, a series of vertical type channels each adapted to hold a stack of type of a single character, an indicator extending across the front of the channels indicating the character of type in each channel, a carrier movable across the front of the channels, a stick supported in vertical position in the carrier and open at the bottom end to receive type, a pointer on the carrier for the said indicator whereby the stick may be positioned relative to any predetermined channel, an ejector movable with the carrier adapted to eject a single type from the bottom of any channel into the bottom of the stick, and means operating subsequent to the ejecting movement of the ejector for moving the type upward in the stick to permit the injection of a succeeding type therebelow.

15. In a typesetting machine, a series of vertical type channels each adapted to hold a stack of type of a single character, a carrier movable across the front of the channels, a stick supported in the carrier in parallel relation with the type channels, an ejector movable with the carrier adapted to eject type from the bottom of any channel into the bottom of the stick, and means operated by the ejector subsequent to its ejecting movement for raising the type in a stick to position to permit injection of a succeeding type therebelow.

16. In a typesetting machine, a series of vertical type channels positioned side by side and each adapted to hold a stack of type of single character, an indicator extending across the channels indicating the character of the type in each channel, a carrier reciprocable across the front of the channels, a stick in the carrier adapted to receive a line of type, a pointer movable by the carrier across the indicator whereby the stick may be positioned relative to a predetermined channel, a rod across the front of the machine supporting the carrier, a rod across the rear of the machine, the base of the carrier member extending to and riding thereon, a reciprocable ejector carried by said base portion, an ejector for turning the said rod independently of the movement of the carrier, and means whereby the turning of the rod operates the ejector.

17. In a typesetting machine, a series of vertical type channels positioned side by side, each adapted to hold a stack of type of a single character, a carrier movable across the front of the channels, a stick supported by the carrier adapted to receive a line of type, means whereby the position of the stick relative to any desired channel may be determined, said channels being adapted to hold the stack of type with the lowermost type of each channel in horizontal alinement, means for preventing displacement of the type transversely of the channels, the said lowermost type being free to be moved transversely, an ejector movable with the carrier consisting of a reciprocable plunger for moving the type out of the carrier into the stick, a guide at the back of the machine for guiding the ejector into the predetermined channel, said guide positioning the carrier with the stick in position to receive the ejected type, independent means for actuating the ejector, a plunger reciprocable within the stick onto which the type is placed by the ejector, means acting subsequent to the positioning of the type adapted to move the plunger upward in the stick, and spring-actuated means for supporting the type in the stick.

18. In a typesetting machine, a series of vertical type channels positioned side by side each adapted to hold a stack of type of a single character, a carrier movable across the front of the channels, a stick supported by the carrier adapted to receive type from the channels, an indicator providing means for positioning the stick relative to any predetermined channels, an ejector by means of which the type may be moved from a channel into the stick, a plunger vertically reciprocable in the carrier and having an end thereof positioned within the stick, the ejected type being positioned on the plunger, a spring-pressed retainer extending into the stick and providing a retainer shoulder above the plunger, means connected with the ejector whereby on return of the ejector to normal position the plunger is raised in the stick to position the type on said shoulder, and an indicator actuated by the type as they are positioned in the stick indicating the number of ems required to complete the line of type.

19. In a typesetting machine adapted to set type in a stick, a series of vertical type receiving channels positioned side by side, a receiver for holding "dead matter," a distributer device adapted to move type step by step across the upper open ends of the channel, an ejector adapted to move the type one by one into the distributer device, the upper end of said channels each being keyed to receive a type of single character, the type being complementally shaped to enter the respective channel therefor, means whereby the said ejector for the "dead matter" is actuated by the setting of type in the stick.

20. In typesetting mechanism, an open-ended stick adapted to hold a line of type, a galley in which the lines of type are set, a stripper finger at the lower side and forward end of the galley adapted to strip the type from the stick by movement of the stick transversely of the galley causing engagement of the stripper with the type and depositing the same in the galley, and means for moving the line bodily from the deposited position to assembled relation with the body of matter in the galley.

21. In typesetting mechanism, a stick open at each end adapted to hold a line of type, a galley or form in which the lines of type are to be set, a stripper finger at the lower side and forward end of the galley adapted to strip type from the stick by movement of the stick transversely of the galley, a dividing plate between the deposited line and the body of type in the galley, an aperture in the forward end of the galley through which the plate projects, a depressible lever to which the plate is attached, a bar extending across the end of the galley normally spaced from the plate providing a channel in which the type are deposited, a lever to which the bar is attached, the depressing of the first named lever withdrawing the plate and then actuating the second lever to move the bar longitudinally of the galley and position the line of type on the opposite side of the aperture for the plate, and release of the first named lever again positioning the plate forward of the said positioned line.

22. In typesetting mechanism, a stick open at opposite ends adapted to hold a line of type, a galley or form for receiving the lines of type, a stripper device at the lower side and forward end of the galley consisting of a U shaped member having a downwardly depending stripper finger adapted to engage in the stick and by movement of the stick transversely of the galley strip the type therefrom, a plate normally forming a supporting wall for the type in the form at the forward end, a bar extending across the forward end of the galley normally spaced from the plate providing a channel therebetween into which the line of type is deposited from the stick, and means for withdrawing the plate and subsequently moving the said bar longitudinally of the galley to force the deposited line of type to position in the galley.

23. In typesetting mechanism, a stick for holding a line of type, a galley or form for receiving the lines of type, a stripping device at the forward end of the galley adapted by movement of the stick transversely of the galley to strip the line of type therefrom, a plate normally supporting the type at the forward end of the galley, a bar normally spaced therefrom providing a channel in which the line of type is disposed, a pick-up device at the lower end of the said channel by means of which points at the lowest end of the line may be raised above the line to position ready for withdrawal by the operator for repositioning in the line, and means for withdrawing said plate and subsequently moving the said bar longitudinally of the form to position the line of type in the galley and return the plate to position to support the same.

24. In typesetting mechanism, a series of type channels each holding a specific character of type, a carrier movable across the lower end of the channels, an open-ended stick supported in the carrier, mechanism for discharging type from any predetermined channel to set a line in the stick, a galley in which the lines of type are to be set, a stripper device at the forward end of the galley adapted to strip the type from the stick by manual movement of the stick transversely of the galley, and means for moving a deposited line to assembled relation with the matter in the galley substantially as described.

25. In a typesetting machine, a series of type channels each adapted to hold a stack of type of a single character, a carrier movable across the front of the channels at the lower end, a stick for holding a line of type supported in the carrier in parallel relation with the type channels, an ejector movable with the carrier and adapted by manual operation to eject type from the bottom of any channel into the bottom of the stick, means operated by the ejector subsequent to its ejecting movement adapted to raise the type in the stick to position to permit injection of a succeeding type therebelow, and means actuated by the stack of type in the stick adapted when the stick is partially filled to indicate the number of ems required to complete the line in the stick.

26. In a typesetting machine, a series of type channels each adapted to hold a stack of type of a single character, a carrier movable across the front of the channels at the lower end, a stick supported in the carrier and adapted to receive type from any channel, an ejector movable with the carrier adapted to eject type from the bottom of any channel into the bottom of the stick, means operated by the return movement of the ejector adapted to raise the type to position in the stick to permit injection of a succeeding type therebelow, a support or base for holding a block of "dead matter" at the top of the type channels, a distributing mechanism for distributing type to the respective channels, and an ejector adapted to eject a type at a time from the "dead matter" into the distributing mechanism, said "dead matter" ejector and distributing mechanism being operable by movement of the typesetting ejector.

27. In a typesetting machine, a series of type channels each adapted to hold a stack of type of a single character, the channels and the type therefor being keyed, a holder for "dead matter," a distributing mechanism for carrying a type across the upper open ends of the channels, an ejector mechanism adapted to eject a type at a time from the "dead matter" into the distributing mechanism, a carrier movable across the channels at the lower end, a stick supported in the carrier adapted to receive type from any channel, an ejector movable with the carrier adapted to eject a type from the bottom of any channel into the stick, and means connecting the typesetting ejector with the "dead matter" ejector to simultaneously operate the same.

In testimony whereof, I sign this specification.

GEORGE P. DAVIS.